(12) United States Patent
Sawicki et al.

(10) Patent No.: US 8,043,453 B2
(45) Date of Patent: Oct. 25, 2011

(54) SYSTEM AND METHOD FOR REWORKING COMPOSITES

(75) Inventors: Adam J. Sawicki, Pennington, NJ (US); Jason A. Degaetano, Philadelphia, PA (US); Philip G. Persaud, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 880 days.

(21) Appl. No.: 11/736,496

(22) Filed: Apr. 17, 2007

(65) Prior Publication Data
US 2010/0024958 A1 Feb. 4, 2010

Related U.S. Application Data

(63) Continuation-in-part of application No. 11/318,113, filed on Dec. 23, 2005, now abandoned.

(51) Int. Cl.
*B32B 37/00* (2006.01)
*B29C 73/00* (2006.01)
*B29C 47/76* (2006.01)

(52) U.S. Cl. ............ 156/87; 156/94; 156/285; 156/286; 264/101; 264/102; 264/510; 264/571

(58) Field of Classification Search .................... 156/87, 156/286, 510, 571; 264/102, 510, 571
See application file for complete search history.

(56) References Cited

U.S. PATENT DOCUMENTS

| | | | |
|---|---|---|---|
| 4,942,013 A * | 7/1990 | Palmer et al. ................. | 264/511 |
| 5,281,388 A | 1/1994 | Palmer et al. | |
| 5,576,030 A | 11/1996 | Hooper | |
| 6,017,484 A | 1/2000 | Hale | |
| 6,270,603 B1 | 8/2001 | Westermann et al. | |
| 6,391,436 B1 | 5/2002 | Xu et al. | |
| 6,761,783 B2 * | 7/2004 | Keller et al. ................. | 156/94 |
| 2001/0054473 A1 | 12/2001 | Chou et al. | |
| 2003/0188821 A1 | 10/2003 | Keller et al. | |
| 2006/0062950 A1 * | 3/2006 | Catella ........................ | 428/35.2 |

OTHER PUBLICATIONS

Zip-Vac, Reusable Vacuum and Pressure Bagging Systems for Composites Production, 2 pages.
Cytec Engineered Materials, printout of home page from Internet site http://www.cytec.com/business/EngineeredMaterials/Cycom%205250—4rtm-shtm, printed on Dec. 8, 2005, 1 page.
Bryte Technologies, Inc. EX-1551-1 Resin System, product description, Sep. 2001, 1 page.
VANTICO Polymer Specialties, AroCy@ L-10 Cyanate Ester Monomer, Data Sheet; Sep. 2002, 4 pages.
Hexcel Composites, Redux HP655 Toughened BMI film adhesive, Product Data, Feb. 1999, 6 pages.
Material Safety Data Sheet, HYSOL EA 9369, Loctite Aerospace, Apr. 2001, 5 pages.

\* cited by examiner

*Primary Examiner* — Khanh P Nguyen
*Assistant Examiner* — Carson Gross
(74) *Attorney, Agent, or Firm* — Klintworth & Rozenblat IP LLC

(57) ABSTRACT

The present application is directed to methods of preparing a wet composite patch for use in various applications, such as, for example, reworking a composite part of an aircraft. The method comprises heating the composite patch to a temperature that causes resin containing gaseous components to flow from the patch through a flow path. The gaseous components are vented from the resin while restricting the flow of resin from the composite patch by restricting the flow of resin through the flow path. Systems for performing the methods of the present application are also disclosed.

17 Claims, 10 Drawing Sheets

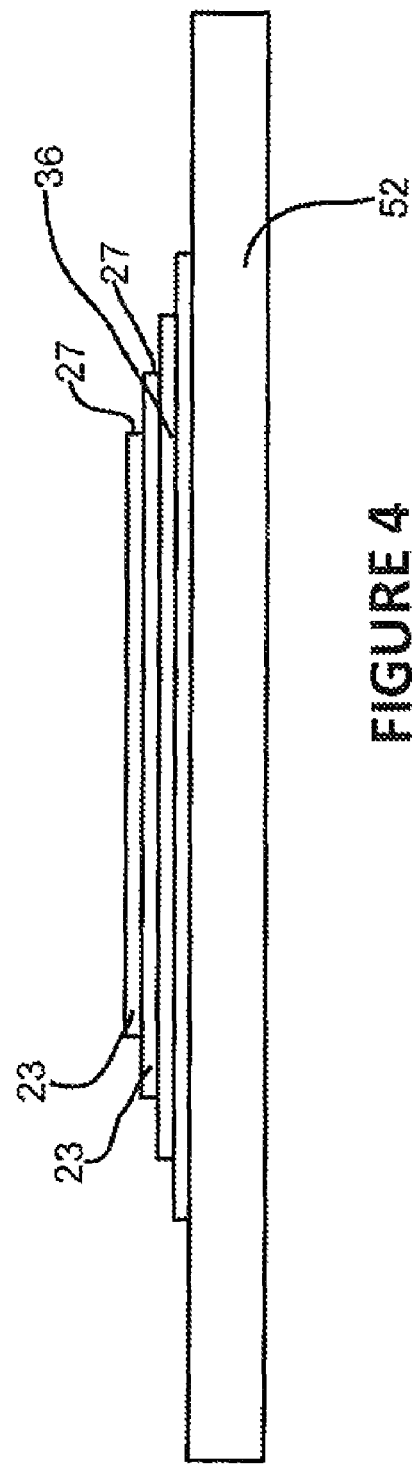
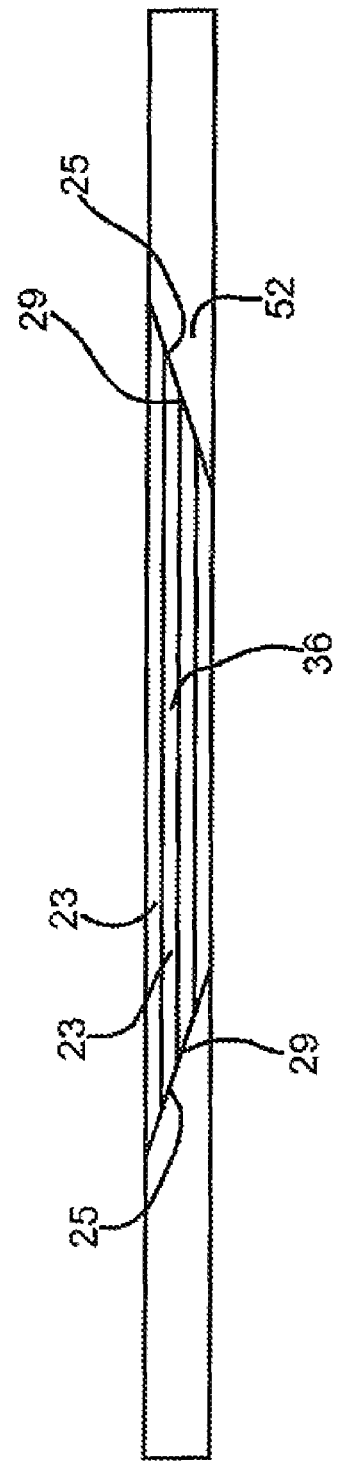

SYSTEM AND METHOD FOR REWORKING COMPOSITES

RELATED APPLICATIONS

This application is a continuation-in-part of U.S. application Ser. No. 11/318,113, titled System and Method for Repairing Composites, filed on Dec. 23, 2005, now abandoned.

The embodiments of this disclosure were made with Government support under contract number DAAH10-02-2-0002 awarded by the United States Army. The government has certain rights in this disclosure.

BACKGROUND

The present application is directed to systems and methods for reworking composite materials.

Composites are used in a variety of applications in the aerospace industry, in space craft, and in other military and commercial applications. Increasingly, high temperature composites, such as Bismaleimide (BMI) resin composites are used in many of these applications. In certain applications, the composites must be capable of withstanding extreme conditions, including high temperatures of, for example, 300° F. to 500° F., and high humidity conditions, for long periods of time.

Parts made from composites may develop inconsistencies during use and require rework. The inconsistency may be sustained in any number of ways, such as by taking a hit during combat or other events or during severe weather conditions, or by exposure to high temperatures. It is desirable that any rework made to the composite be capable of withstanding the extreme conditions the original composite structure was designed to handle. In certain situations, it is also desirable that the rework conform to the original shape of the composite, so that the rework does not interfere with, for example, the aerodynamic design of the aircraft. Achieving conforming reworks can be difficult, given the complex shapes and highly curved surfaces of composite parts.

A number of processes have been used in the past for reworking composite parts. For example, bolted metal patches have been used for reworking aircraft composites. In these processes, a metal, such as titanium, is machined to form a patch having the desired shape and then bolted over the inconsistent portion of the aircraft. However, procuring titanium may require a long lead-time, and machining, forming and drilling titanium can be challenging. In addition, metal patches may increase the radar signature of the aircraft, and thus may not be a viable rework option for some aircraft.

Bonded, precured BMI composite patches have been used to rework BMI composite parts. In some processes, a BMI composite patch is formed from prepreg materials. The composite patch can then be cured on-aircraft using a release film which allows the patch to be removed from the aircraft after the cure step is complete, followed by a post cure in, for example, an autoclave or oven. After the post-cure is complete, the composite patch is bonded to the aircraft with a film adhesive. Bonding precured BMI composite patches in this manner can be a relatively long and complex process. In addition, the prepreg materials used to form the composite patch often have a limited shelf/storage life. Since prepreg materials generally require freezer storage, there are associated increased storage and transport related logistical costs. The limited shelf life, as well as the storage and transport related logistics, may be particularly problematic in certain military applications, where freezer storage may be limited, or where it may be desirable to rework an aircraft in the field so that it may be redeployed in a short amount of time.

SUMMARY

The above-mentioned drawbacks associated with existing composite rework processes are addressed by embodiments of the present application, which will be understood by reading and studying the following specification.

One embodiment of the present application is directed to a method for reworking a composite part of an aircraft. The method comprises forming a wet composite patch comprising resin, the resin containing gaseous components. The wet composite patch is debulked to reduce the amount of gaseous components in the composite patch, and the composite patch is then cured and attached to the surface of the composite part. The debulking of the wet composite patch comprises providing a flow path through which the resin may flow from the composite patch. The composite patch is then heated to a first temperature, causing a portion of the resin to flow from the composite patch through the flow path. The flow of resin from the composite patch is limited during debulking by restricting the flow of resin through the flow path.

Another embodiment of the present application is directed to a method of preparing a wet composite patch for use in reworking a composite part. The method comprises heating the composite patch to a temperature that causes resin containing gaseous components to flow from the patch through a flow path. The gaseous components are vented from the resin while restricting the flow of resin from the composite patch by restricting the flow of resin through the flow path.

Another embodiment of the application is directed to a system for preparing a composite patch comprising a resin containing gaseous components. The system comprises a flow path capable of restricting a flow of the resin from the composite patch. The flow path comprises a first portion having a first flow capability and a second portion having a second flow capability, which is less than the first flow capability. The flow path is positioned over, and in fluid connection with, the composite patch. Physical barriers are positioned to restrict the flow of resin through the flow path, so that the gaseous components are capable of venting through the physical barriers and the remaining resin is not capable of flowing through the physical barriers.

These and other embodiments of the present application will be discussed more fully in the detailed description. The features, functions, and advantages can be achieved independently in various embodiments of the present application, or may be combined in yet other embodiments.

DRAWINGS

FIG. 4 illustrates a partial cross-sectional front view of one embodiment of the present application where a composite patch is bonded to a flat surface of a composite part.

FIG. 5 illustrates a partial cross-sectional front view of one embodiment of the present application where a composite patch is bonded to tapered surfaces of a composite part.

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments. These embodiments are described in sufficient detail to enable those skilled in the art, and it is to be understood that other embodiments may be utilized and that various changes may be made without departing from the spirit and scope of the present disclosure. The following detailed description is, therefore, not to be taken in a limiting sense.

Figure 1:
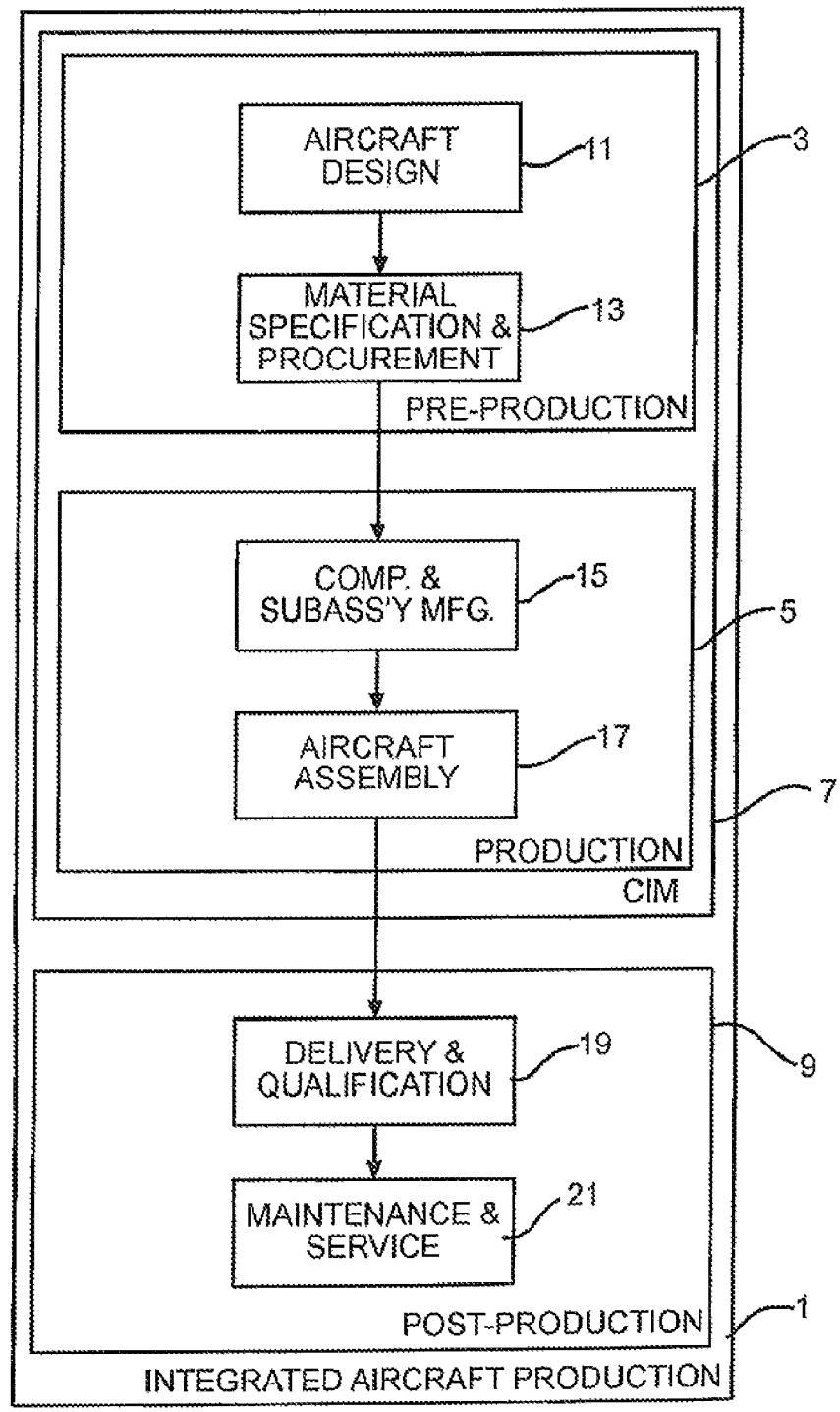
FIG. 1 illustrates a flow chart of an integrated production process in accordance with embodiments of the present application.

FIG. 1 illustrates an integrated production process 1, in accordance with embodiments of the present disclosure. As used herein, integrated aircraft production process 1 also may include manufacturing, support, or both. Typically, process 1 includes a preproduction phase 3, a production phase 5, and a post-production phase 9. Preproduction phase 3 may include aircraft design, subassembly, and component design 11, and material specification and procurement 13. Material specification and procurement 13 may include selection and procurement of components fabricated, or subassemblies manufactured, by third parties, without limitation, vendors, subcontractors, or suppliers. Production phase 5 may include component fabrication or subassembly manufacturing 15, and aircraft assembly 17. Pre-production phase 3 and production phase 5 can be elements of an integrated manufacturing process 7, including one or more of aircraft and component design, development, and simulation processes; material, component, and subassembly specification and procurement processes; automated production planning processes; fabrication and assembly processes; and quality control processes.

Frequently, aspects of a modern aircraft production process, such as integrated process 1, do not end with final assembly but may extend over the service life of an aircraft, involving iterative and interactive collaborations between manufacturer, governmental authorities, customers and aircraft operators. Accordingly, integrated production process 1 can include post-production phase 9. Post-production phase 9 may include aircraft delivery and qualification 19, and aircraft service 21. Aircraft delivery and qualification 19 may include providing an aircraft to customer specifications, which may have changed after an aircraft was assembled. Thus, delivery and qualification can include rework, modification, or revision of one or more elements of an aircraft after delivery to a customer or operator. Also, it may be desirable to perform a modification, rework, or an upgrade to an aircraft in the service interval between aircraft delivery and retirement. Therefore, aircraft service 21 can include rework, modification, or upgrade of a portion of an airframe, including an airframe manufactured or assembled using traditional, pre-existing materials, components, or subassemblies.

Apparatus and methods embodied herein may be employed during integrated production process 1 in one or more of phases 3, 5, or 9. For example, components or subassemblies corresponding to production phase 5 may be fabricated or manufactured in a manner similar to components or subassemblies procured during preproduction phase 3, and vice versa. Also, one or more of an apparatus embodiment, a method embodiment, or a combination thereof may be of particular benefit during production phase 5, for example, by substantially expediting component and subassembly manufacturing 15, or assembly of an aircraft 17. One or more of an apparatus embodiment, a method embodiment or a combination thereof may be of benefit during post-production phase 9, for example, without limitation, to rework during delivery and qualification 19 and/or maintenance and service 21.

Figure 2:
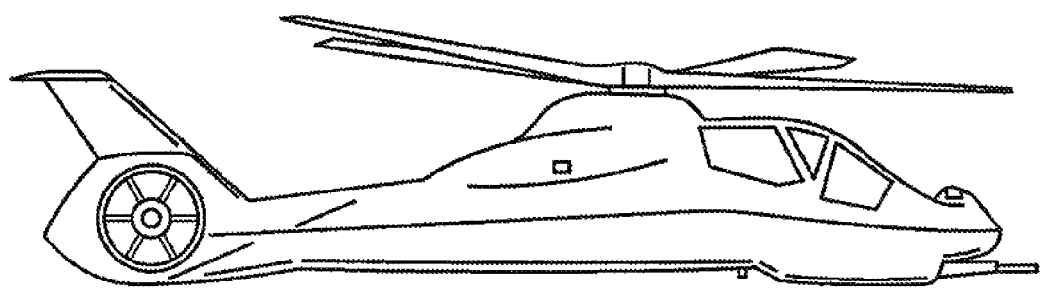
FIG. 2 illustrates one example of an aircraft which may benefit from the rework methods of the present application.

Composite structures are commonly used in a large number of industries. For example, the aerospace industry employs composites in a variety of applications. FIG. 2 illustrates one exemplary aircraft, a helicopter, in which composites may be employed. In many aerospace applications, such as rotor craft, fixed-wing aircraft, spacecraft, as well as other aircraft, certain composite parts may be subject to extreme temperature conditions. High temperature composite materials have been developed from which these composite parts may be formed. For example, composite parts fabricated with Bismaleimide (BMI) resins are well known in the art for use at temperatures of up to 500° F. Such high temperature composites may be employed to form lightweight exhaust ducts and fairings, lightweight firewalls, and other parts that may be exposed to heat from the engine and/or engine exhaust, air friction, as well as heat from other sources.

Figure 3:
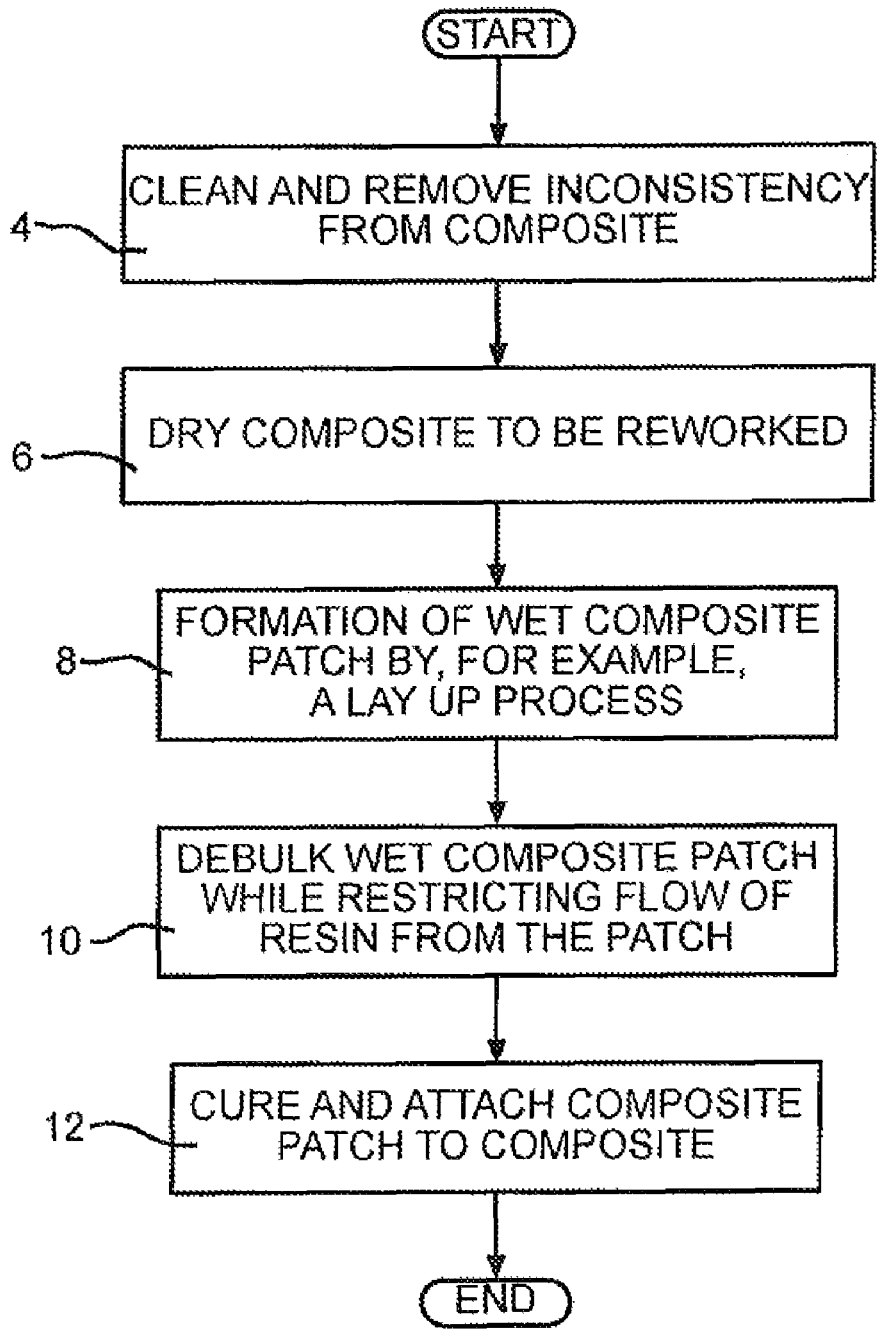
FIG. 3 illustrates a flow chart of a process for reworking composites, according to one embodiment of the present application.

FIG. 3 illustrates a flowchart of a method for reworking inconsistencies in composite parts, according to one embodiment of the present application. Steps 4 to 12 represent various processes used to perform the rework method. The rework method is not limited to the particular processes illustrated. For example, certain processes may be omitted and/or certain other processes added to the rework method. In addition, the processes of the rework method are not intended to be limited to the order in which they are listed, and may be performed in any suitable order. For example, in certain embodiments, the wet layup composite patch may be formed before the cleaning and drying processes, or simultaneously therewith. In yet other embodiments, additional cleaning and/or bonding preparation processes may be performed prior to the cure process of step 12.

One exemplary additional process which may be performed after the debulking process of step 10 and before the cure process of step 12 is a conforming process, in which the wet composite patch is shaped to the contour of the aircraft part. The ability of a wet lay up patch to conform to the contour of complex shapes is a known benefit of wet lay up processes. Other additional processes which may be performed in certain embodiments of the FIG. 3 rework method may include one or more non-destructive inspection (NDI) processes, using, for example, pulse echo ultrasonics, as is well known in the art. The NDI processes may be performed to inspect the inconsistent composite prior to rework, and/or to inspect the composite patch.

Step 4 of the rework method flowchart of FIG. 3 refers to a process for cleaning and removing an inconsistency from the composite. Any suitable cleaning processes may be employed. For example, the cleaning process may be performed using conventional cleaning processes and aerospace detergents. The process of removing inconsistent material may comprise removing any loose or hanging portions of the composite, as well as sanding procedures, which are well known in the art.

Step 6 of the rework method flowchart refers to a drying process which removes moisture from the inconsistent composite part to be reworked. In humid environments, composites absorb moisture. If the moisture is not removed from the composite being reworked prior to bonding the composite patch, the water may boil off when the part is subsequently exposed to high temperatures, such as during post cure processing and/or during operation of the aircraft, which may cause delamination of the composite patch. Additionally, moisture can cause other problems, depending on the materials used for the composite patch. For example, in certain of the embodiments of the present application, the composite patch is formed from cyanate ester resins. When processed in the presence of water, these cyanate esters form by-products called carbamates. The formation of carbamates in the composite patch can cause excessive voids, porosity and delamination, as well as a reduced glass transition temperature of the composite patch material.

In order to prevent such problems, the drying process of step 6 may be employed to remove moisture from the composite to be reworked prior to performing the curing and bonding processes of step 12. The parameters of the drying process may vary depending on the materials involved. Drying processes according to various embodiments of the present application will be discussed in greater detail below.

Step 8 of the flowchart illustrated in the embodiment of FIG. 3 refers to the formation of a wet composite patch by, for example, a lay up process. Formation of the wet composite patch involves the application of a resin to sheets of dry fabric. The resin may have a viscosity, which is sufficiently low so that the resin wets-out the fibers of the fabric using, for example, manual spreading techniques. Individual plies having the desired shape of the composite patch may then be cut from the resin-impregnated fabric. The plies may then be stacked to form a wet composite laminate patch.

The resin comprises gaseous components, which may include both air entrapped in the resin and/or volatile components, such as low molecular weight compounds, which may form gases within the wet composite patch during heating. If these gases, including the entrapped air, are not reduced to sufficiently low levels in the wet composite patch prior to curing, gas filled pores may form in the composite patch. Additionally, when the resin is heated during the debulking and/or curing processes referred to in steps 10 and 12, the viscosity of the resin can be temporarily reduced to levels which cause the resin to bleed out of the wet composite patch. Excessive bleeding can cause pores to form in the composite patch due to a lack of resin between the fibers of the fabric. If the porosity of the composite patch is too great, either due to entrapped gases or resin bleeding from the composite patch, a poor quality composite patch may result. Additionally, patch porosity may make it difficult to inspect the bondline quality of the patch using traditional composite non-destructive inspection techniques, such as pulse echo ultrasonics, since patch porosity can attenuate the ultrasonic signal above the bondline, making it difficult to assess the bondline itself.

In order to form a composite patch having reduced porosity levels and increased strength, a debulking process referred to in step 10 of FIG. 3 may be carried out prior to curing the wet composite patch. As will be described in greater detail below, the flow of resin may be restricted during the debulking process, in order to reduce the amount of resin which bleeds out of the composite patch.

One purpose of the debulking process is to reduce the concentration of gaseous components, defined herein to include both entrapped air and/or volatiles in the wet composite patch, so that a desired level of porosity may be achieved when the composite patch is subsequently cured. This is generally accomplished by heating the composite patch under vacuum at conditions which result in a sufficient reduction of the gaseous components in the wet composite patch.

In one embodiment, the debulking process may also advance the polymerization of the resin, thereby increasing the viscosity to a point where excess bleeding will not occur during the subsequent curing process referred to in step 12. The resin may be advanced to any desired degree so as to achieve the desired viscosity. In one such embodiment, the resin in the wet composite patch is preferably only partially polymerized during the debulking process, so that the wet composite patch remains sufficiently flexible to subsequently conform to the desired shape of the composite being reworked.

Heating during the debulking process may cause the resin to bleed excessively from the wet composite patch, as indicated above. To avoid this problem, it may be desirable to restrict the flow of resin from the wet composite patch during heating. One embodiment for restricting the flow of resin comprises providing a flow path for removing both resin and gases from the composite patch. Physical barriers are provided which restrict the flow of resin through the flow path, while allowing the gases to be removed from the resin through the barriers. This and other debulking embodiments will be discussed in greater detail below.

As indicated in step 12 of the embodiment of FIG. 3, a curing process 12 is carried out to more completely polymerize the resin in the wet composite patch. In general, any suitable curing process may be employed which will provide the desired patch properties. In one embodiment, the temperature and dwell times for the cure process may be chosen to advance the polymerization of the resin to provide a composite patch having a desired glass transition temperature, $T_g$.

In one embodiment, the process of curing and bonding the wet composite patch may comprise applying an adhesive to a surface of the composite being reworked. The wet composite patch is then placed over the surface of the composite in physical contact with the adhesive. Both the wet composite patch and the adhesive are then co-cured on the composite, so that the composite patch is bonded to the composite. The curing process may be performed either on-aircraft, meaning that the composite part being reworked is still attached to the aircraft, or off-aircraft, meaning that the composite part has been removed from the aircraft before the curing process occurs.

In yet another embodiment, a wet composite patch may be cured off the composite part, and then bonded or mechanically fastened to the inconsistent composite once the cure is complete. For example, the wet composite patch may be cured in an autoclave or oven, and then bolted or riveted to the inconsistent composite. Alternatively, the cured composite patch may be bonded to the inconsistent part using an adhesive.

Certain processes of the rework method of the present application, as discussed above, will now be described in more detail.

As discussed above, the drying process referred to in step 6 may be employed to remove moisture from a inconsistent composite part by heating the portion of the composite to which a composite patch will be bonded. Any suitable drying process may be employed which will result in the desired reduction in moisture content of the reworked part. In one embodiment, the drying process comprises heating the reworked composite to a drying temperature $T_d$ under vacuum pressure $P_d$. Temperature, $T_d$, and pressure, $P_d$, will vary depending on the composite material to be dried, the level of moisture in the composite, and the material being used for the composite patch. Exemplary drying temperatures may range from 100° F. to 450° F. Exemplary pressures may range from 1 inch Hg to atmospheric pressure (about 29.92 inches Hg at sea level).

The heat for drying may be provided by any suitable heat source, such as, for example, a heating blanket. In one embodiment, where the composite being reworked is a part which can be heated on-aircraft by running the engines of the aircraft, the aircraft may be operated for a time period prior to performing the rework to remove sufficient moisture from the inconsistent part.

In one embodiment, temperature $T_d$ and pressure $P_d$ may be approximately the same as the temperature and pressure that will subsequently be used to cure the composite patch. For example, where the composite patch is formed from a dicyanate ester resin having a cure temperature of about 410° F. at 25 inches Hg, the drying temperature $T_d$ may range from about 395° F. to about 425° F., and would more preferably be about 410° F., at a drying pressure $P_d$ of about 25 inches Hg or less.

The length of time of the drying process may be any suitable amount of time, which will reduce the moisture content of the composite to within a desired range. In one embodiment, the drying conditions $T_d$ and $P_d$ may be maintained for a period of 20 minutes or more. For example, the drying conditions may be maintained for a period of about 30 minutes to about 240 minutes. In one embodiment, the drying conditions may be maintained for a period of about 2.5 hours.

The process of forming the composite patch will now be described in more detail. As described above with reference to step 8 of FIG. 3, the formation of the composite patch may be performed, for example, by a lay up process, which preferably comprises impregnating sheets of fabric with resin, laying up a plurality of wet plies from the impregnated sheets, and stacking the plies to form a composite patch.

The sheets of fabric used for forming the composite patch may comprise any suitable fabric. Examples of such fabrics include carbon or glass woven fabrics, which are well known in the art for use in composites. In one embodiment, the fabric comprises fiberglass. In yet another embodiment, the fabric comprises astroquartz. The fibers of the fabric may be chemically treated to prevent fraying and/or to improve adhesion to the resin, as is well known in the art.

In one embodiment, the resin used to impregnate the fabric may be any suitable resin which has a viscosity low enough to allow the fabric to be wetted-out at or near room temperature (i.e., at 25° C.). For example, the resin may have an absolute Brookfield viscosity ranging from about 0.1 poise to about 10 poise at 25° C., or any viscosity there between. In another embodiment, the absolute Brookfield viscosity ranges from about 0.5 poise to about 5 poise at 25° C. In still another embodiment, the absolute Brookfield viscosity is about 1 poise at 25° C. In other embodiments, the resin may require heating to achieve the low viscosities set forth above.

The resin may also be chosen to provide suitable material characteristics, such as adequate strength, thermal durability, and chemical resistance to cleaning agents and other chemicals the composite patch may come into contact with. In an embodiment where the wet patch is cured in place on the inconsistent composite, the resin may also be chosen based on whether it can be adequately cured at temperatures which will not cause thermal difficulties with the composite being reworked.

The term resin is meant to include single resin systems and blends of resins. In one embodiment, the resin comprises a low viscosity cyanate ester resin, such as a cyanate ester resin have a viscosity within the ranges set forth above. Low viscosity cyanate ester resins are well known in the art. Examples include resins comprising dicyanate ester monomers, such as AroCy® L10, or AroCy® B-10, both of which are manufactured by Vantico. Other exemplary cyanate ester resins which may be employed include EX-1551-1, manufactured by BRYTE Technologies, Inc, and DJ205, manufactured by YLA, Inc. In one preferred embodiment, the composite being reworked comprises a BMI resin, and the composite patch comprises a dicyanate ester monomer, such as AroCy® L10 resin.

In other exemplary embodiments, the resin employed in the composite patch may be a high temperature epoxy resin, such as an epoxy resin having a $T_g$ in excess of about 300° F., or a bismaleimide (BMI) resin, where the resins have suitable low viscosities, as described above. Such high temperature epoxy resins and BMI resins are well known in the art. Examples of high temperature, low viscosity epoxy resins include HyComp 400, manufactured by Dexter Composites, and Araldite® MY721, manufactured by Vantico. One example of a suitable BMI resin is CYCOM 5250-4®, manufactured by Cytec Industries, Inc. In order to reach the desired viscosities for fabric impregnation, as described above, the CYCOM resin may be heated to temperatures of about 200° F. or more.

The resin may be applied to the fabric by any suitable technique. In one embodiment, the resin may be applied manually using a squeegee or other device for working the resin into the fabric, as is well known in the art. The impregnated sheets of fabric are then formed into plies having the desired shape of the composite patch, and stacked to form the laminate, as is also well known in the art.

The composite patch may be adapted to be attached, attached to, and/or used to rework, a surface of a composite part, such as a composite part of an aircraft, a composite part of a subassembly of an aircraft, or a composite part of another aeronautical or non-aeronautical device or structure, during a pre-production construction phase, during maintenance, during rework, and/or at another time. In one embodiment, as shown in FIG. 4, the composite patch 36 may be adapted to be bonded and/or bonded onto a surface of an inconsistent composite part 52. The composite patch 36 may comprise a stepped configuration having plys 23 having stepped ends 27, though other configurations may be used without limitation. In another embodiment, as shown in FIG. 5, the composite patch 36 may be adapted to be bonded and/or bonded in a substantially flush (or scarf) configuration aligned with tapered surfaces 25 of an inconsistent composite part 52. The composite patch 36 may comprise plys 23 having tapered ends 29. In yet another embodiment, the composite patch 36 may be adapted to be bolted and/or bolted to one or more surfaces in any configuration of an inconsistent composite part 52. In still other embodiments, the composite patch 36 may have varying configurations, such as non-stepped or non-tapered configurations. In additional embodiments, the surface of the inconsistent composite part 52, to which the composite patch 36 may be bonded in a stepped configuration, may be bonded to in a substantially flush configuration, or may be bolted to, may be in any shape, size, or configuration, including a curved shaped surface, a tapered shaped surface, a flat shaped surface, and/or other shaped surface.

Once the composite patch is formed, a debulking process may be carried out to reduce the concentration of gaseous components, including entrapped air and/or volatiles, in the wet composite patch, and to optionally advance the polymerization of the resin, thereby increasing the viscosity to a point where excess bleeding will not occur during the cure step, as described above with respect to step 10 of FIG. 3.

Figure 6:
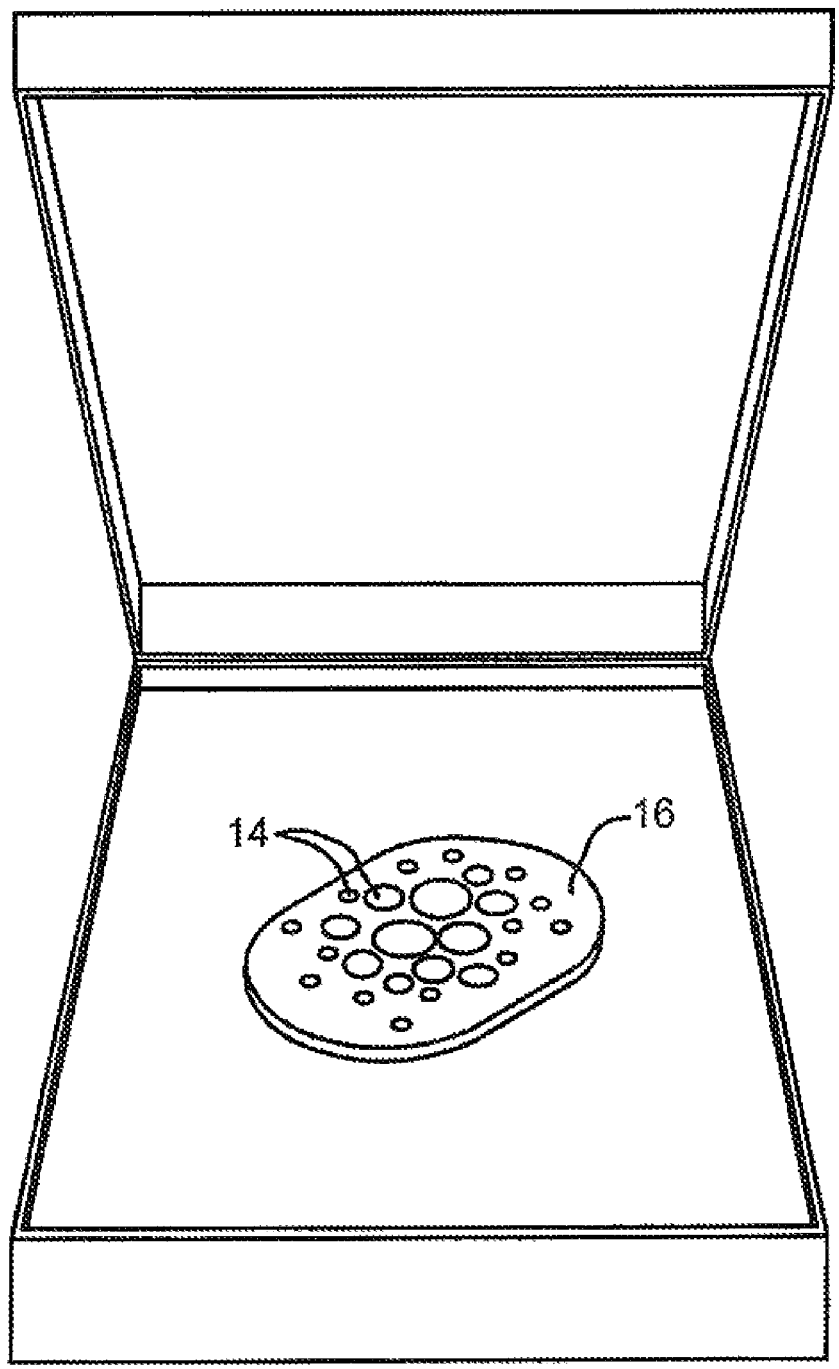
FIG. 6 illustrates an open debulking chamber where excess resin has bled through breather plies placed over a composite patch during a conventional debulking process.

As mentioned above, heating during the debulking process may cause the resin to bleed excessively from the wet composite patch. FIG. 6 shows an open debulking chamber where excess resin 14 has bled through breather plies 16 placed over a composite patch (not shown), during a conventional debulking schedule. Excess bleeding of the resin from the wet composite patch can cause pores to form in the composite patch.

Figure 7:
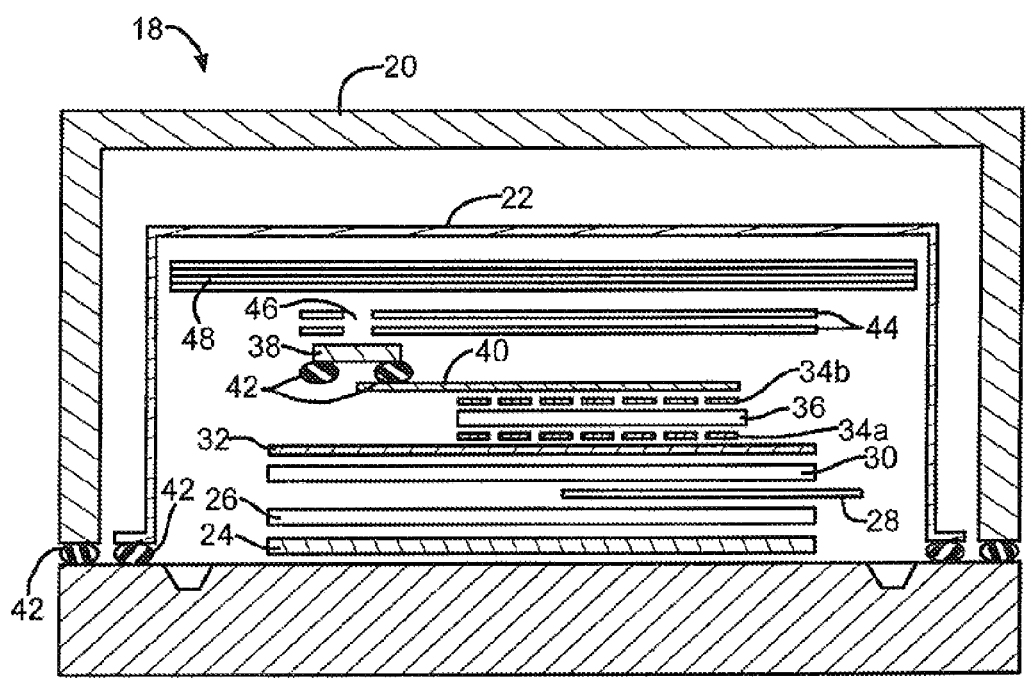
FIG. 7 illustrates a schematic drawing of an assembly for restricting the flow of resin from a wet composite patch in a double vacuum debulking box, according to one embodiment of the present application.

To avoid this, it may be desirable to restrict the flow of resin from the wet composite patch during heating. FIG. 7 illustrates one embodiment for restricting the flow of resin which involves the use of a double vacuum debulking box (DVDB) 18 comprising a rigid outer box 20 and an inner vacuum bag 22, which may be made of plastic, as is well known in the art. A heating assembly comprising, for example, insulation 24, a heater blanket 26, a thermocouple 28, and a caul sheet 30 may be positioned inside DVDB 18, as is also well known in the art. Other suitable heating assembly arrangements may be employed in place of the assembly described above.

According to an embodiment of the present application, non-porous fabric 32, such as non-porous fiber reinforced Telfon fabric, is positioned over caul sheet 30, as shown in FIG. 7. A first side of composite patch 36 is positioned adjacent to a first porous fabric 34a, which is placed on non-porous fabric 32. A second porous fabric 34b is placed adjacent to a second side of composite patch 36. Porous fabric 34a and 34b may be any suitable material which is permeable to the resin and entrapped gases contained in composite patch 36. One example of such material is porous fiber reinforce Teflon fabric.

One or more semi-permeable filters 38 are positioned proximate to the second porous fabric 34b. The one or more semi-permeable filters 38 are permeable to gases, such as entrapped air in the composite patch, but are impermeable to the liquid resin. Semi-permeable filter 38 may comprise any suitable material, such as, for example, a ceramic material. Suitable semi-permeable ceramic filters are well known in the art. One such filter comprises fusion bonded epoxy resin coated glass beads, and is commercially available from Danner Corporation as part number 70505-1000.

Figure 8:
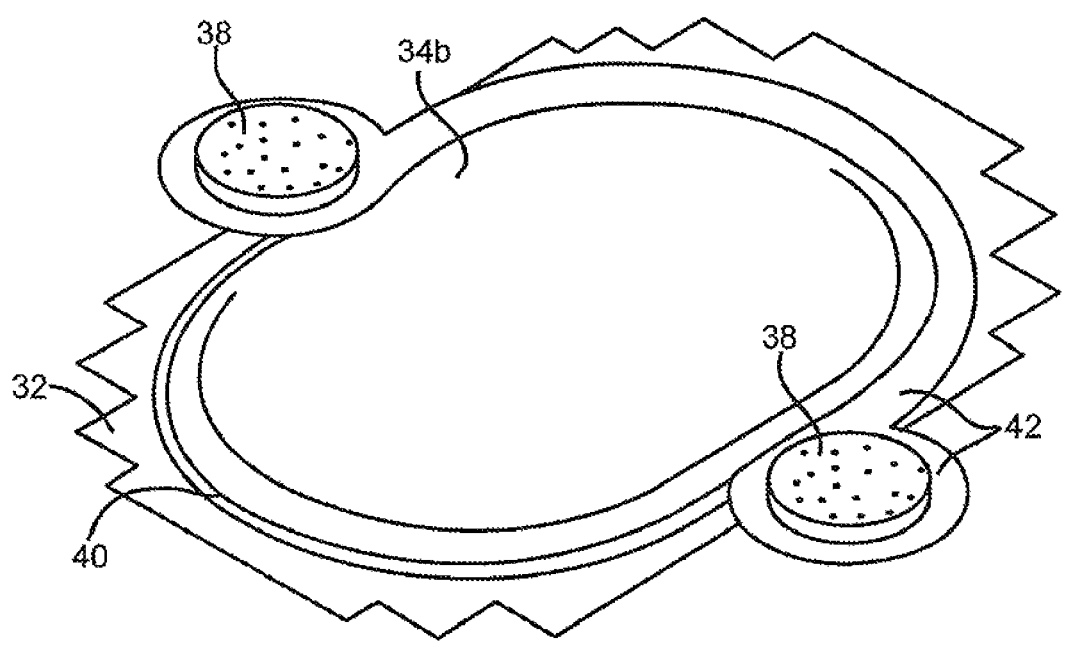
FIG. 8 illustrates a perspective view of the FIG. 7 assembly for restricting the flow or resin from a wet composite, according to one embodiment of the present application.

As illustrated in FIGS. 7 and 8, one or more string bleeders 40 may be positioned around the periphery of porous fabric 34b and adjacent to the one or more semi-permeable filters 38, so that string bleeders 40 are in fluid connection with both porous fabric 34b and semi-permeable filters 38. In order to provide the desired fluid connection between string bleeders 40 and semi-permeable filters 38, according to one embodiment of the present application, the string bleeders 40 may be looped beneath semi-permeable filters 38 within a cavity formed by vacuum bag sealant tape 42, which surrounds the periphery of the semi-permeable filters 38.

String bleeders 40 comprise narrow strips of material, which are permeable to the resin and entrapped gases contained in the composite patch. In one embodiment, string bleeders 40 comprise yarn, such as, for example, a glass filament yarn. One example of a suitable string bleeder is commercially available from Gudebrod as part number 1721-052.

Together, second porous fabric 34b and string bleeders 40 provide a flow path for removing both resin and gases from the composite patch during the debulking process. String bleeders 40 are chosen so that the flow capability of string bleeders 40 is less than the flow capability of porous fabric 34b. Flow capability is defined as the potential flow rate of resin through, for example, the string bleeders 40 or porous fabric 34b. By limiting the flow capability of string bleeders 40 in this manner, the flow rate of resin through the flow path may be restricted, thereby restricting the flow of resin from the composite patch.

A sealing film that is impermeable to resin, and which may comprise an adhesive, such as vacuum bag sealant tape 42, may be employed to seal the edges of the semi-permeable filters 38, as more clearly shown in FIG. 8. The sealing film may also be used to seal the edges of porous fabric 34b and string bleeders 40. While FIG. 8 shows that only a portion of the periphery of porous fabric 34b and string bleeders 40 are sealed for illustrative purposes, a sealing film, such as vacuum bag sealant tape 42, may be employed around the entire periphery in order to effectively seal the string bleeder assembly comprising porous fabric 34b, string bleeder 40 and semi-permeable filter 38.

Referring back to FIG. 7, a film 44, which is also impermeable to resin, is positioned over porous fabric 34b, semi-permeable filters 38 and string bleeders 40. Film 44 may comprise any suitable material which is substantially impermeable to the resin and gases flowing from composite patch 36. One example of a suitable film material is fluorinated ethylene propylene (FEP). Such FEP films are well known in the art.

Film 44 may comprise one or more plies of impermeable material. For example, in the illustrated embodiment, film 44 comprises two plies. Perforations 46 in film 44 are positioned over the one or more semi-permeable filters 38. Perforations 46 act as vents through which gases flowing from the composite patch through the string bleeder assembly can escape.

During the debulking process, resin and gases flow through the porous fabric 34b to string bleeders 40, then through string bleeders 40 to the one or more semi-permeable filters 38. Since semi-permeable filters 38 are impermeable to resin and permeable to gas, the semi-permeable filters 38 act as a barrier to the resin, while allowing the gases to be removed from the resin. The gases removed from the resin continue to flow through semi-permeable filters 38 and are vented through perforations 46 into a breather material 48, from which it may migrate to a vacuum line (not shown) and be evacuated from the assembly. Breather material 48 may comprise any suitable material, such as, for example, one or more layers of dry woven fiberglass.

In the illustrated embodiment, impermeable films, such as vacuum bag sealant tape 42 and film 44, act as physical barriers to the resin, in addition to semi-permeable filters 38, thereby reducing the amount of resin that bleeds out of porous fabric 34b and string bleeders 40 during the debulking process. In this manner, the amount of gaseous components, including gases and/or volatile components, in the composite patch may be reduced while restricting the amount of resin that bleeds from the composite patch.

The particular temperatures and pressures of debulking process 10 are chosen depending on the type of resin used for composite patch 36. For example, temperatures may range from 100° F. to 350° F., and pressures may range from about 1 inch Hg to about atmospheric pressure (i.e., about 29.92 inches Hg).

In one embodiment, the dwell times for the debulking process may be chosen to advance the polymerization of the resin so as to increase viscosity to a level which will reduce bleeding during the subsequent high temperature cure process, while still providing a flexible composite patch which will easily conform to the shape of the composite to be reworked.

Figure 9:
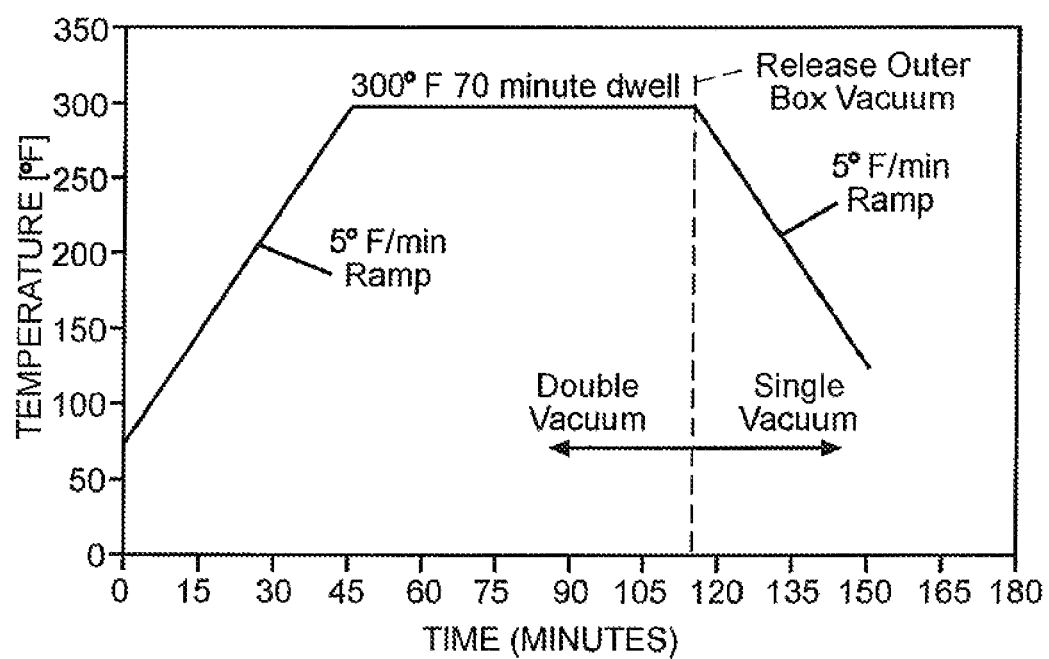
FIG. 9 illustrates a debulking process schedule, according to one embodiment of the present application.

FIG. 9 illustrates an exemplary debulking schedule for an embodiment where composite patch 36 comprises a dicyanate ester monomer resin, such as AroCy® L10 resin. In the illustrated embodiment, the temperature is ramped up to about 300° F. for a period of about 70 minutes. In one embodiment, the debulking schedule illustrated in FIG. 9 may be performed in a double vacuum debulk box, such as DVDB 18 of the FIG. 7 embodiment. In this embodiment, a vacuum pressure, $P_v$, is maintained inside inner vacuum bag 22, and a second vacuum pressure, $P_o$, is maintained in the space between outer box 20 and inner vacuum bag 22. In one embodiment, $P_o$ is maintained at a pressure near that of $P_v$, so as to prevent the inner vacuum bag 22 from being forced down onto composite patch 36 and thereby compressing the patch during the debulking process. For example, if the debulking process pressure, $P_v$, is about 25 inches Hg, $P_o$ is maintained at a higher pressure within about 1 inch Hg of $P_v$, such as about 24 inches Hg. This double vacuum arrangement facilitates the removal of gases from composite patch 36 during the debulking process without compromising the inner bag vacuum seal.

In the illustrated embodiment of FIG. 9, the vacuum in outer box 20 is released after the dwell period at 300° F. is finished, and the temperature is ramped down under a single vacuum in the inner vacuum bag 22. This results in the inner bag being forced down and compressing composite patch 36 to consolidate the plies, which can result in improved properties of the patch, such as enhanced strength.

After the debulking process is finished, a curing process is carried out to more completely polymerize wet composite patch 36, as described above with respect to block 12 of the FIG. 3 embodiment. In one embodiment, wet composite patch 36 is cured on the inconsistent composite. As described above, this embodiment comprises applying an adhesive to a surface of the composite being reworked and then applying the wet composite patch over the surface in physical contact with the adhesive.

The adhesive may be any suitable adhesive which will provide sufficient adhesion between the inconsistent composite and the composite patch to withstand potential peel loads. Examples of adhesives which may be used include BMI paste adhesives, such as HYSOL EA 9369, manufactured by Loctite Corporation; BMI film adhesives, such as Redux® HP655, manufactured by Hexcel Composites; and the resin used in the composite patch itself. For example, in one embodiment where the composite patch 36 comprises a dicyanate ester monomer, such as AroCy® L10 resin, a thin layer of the L10 resin may be applied as an adhesive to the inconsistent composite and/or the surface of the composite patch 36. The adhesive may be applied in any quantity sufficient to provide the desired adhesion. For example, L10 resin may be applied at a rate of 100 drops/ft². In one embodiment, where peel loads are sufficiently low, it may not be necessary to apply an adhesive, as the resin in composite patch 36 may provide a sufficiently strong bond once composite patch 36 is cured on the inconsistent composite.

After the adhesive is applied, composite patch 36 is pressed onto the bonding surface of the composite being reworked, and both wet composite patch 36 and the adhesive are co-cured, so that composite patch 36 is bonded to the reworked composite. In embodiments where the resin is sufficiently viscous so that it will not bleed excessively and form pores in the cured composite patch, the wet composite patch may be cured using conventional curing techniques.

Figure 10:
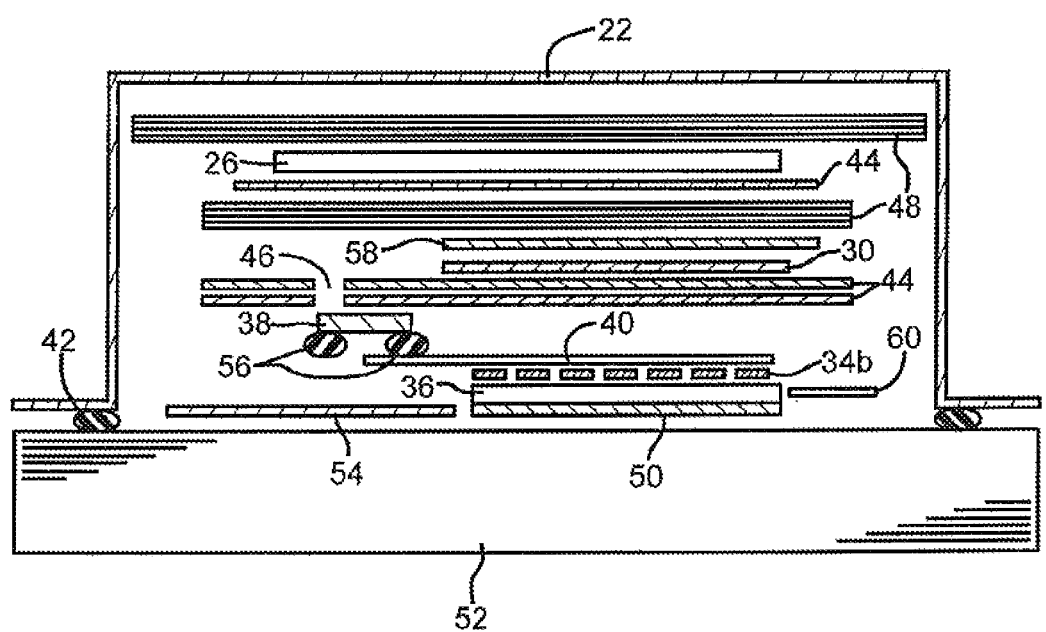
FIG. 10 illustrates a schematic drawing of an assembly for restricting the flow of resin from a wet composite patch during a cure and post cure process, according to one embodiment of the present application.

In embodiments where the resin in the composite patch has a relatively low viscosity, it may be desirable to employ a string bleeder assembly comprising a porous fabric, string bleeder and semi-permeable filter during the cure, similarly as described above for the debulking process. FIG. 10 illustrates a vacuum bag assembly for one such embodiment, illustrating an adhesive film 50 and a composite patch 36 positioned as described above with respect to an inconsistent composite 52. Porous fabric 34b, semi-permeable filter 38, string bleeder 40, and film 44 with perforations 46 are positioned as described above with respect to FIGS. 7 and 8. Film 44 may comprise one or more plies of impermeable material. For example, in the illustrated embodiment, film 44 comprises two plies.

If cure temperatures are high enough, high temperature vacuum bag sealant tape 56 may be employed as an impermeable film instead of standard, lower temperature vacuum bag sealant tape 42 for sealing the edges of the semi-permeable filters 38, porous fabric 34b and string bleeders 40. High temperature vacuum bags and sealant tape are made to withstand temperatures of, for example, about 400° F., or higher, while lower temperature vacuum bags and sealant tape may only be capable of withstanding temperatures substantially lower than 400° F.

In one embodiment, Teflon tape 54 is applied to the surface of inconsistent composite 52. Teflon tape 54 may help to prevent resin from coming into contact with the composite 52, as is well known in the art. In the present application, the use of Teflon tape 54 may help to prevent the resin from bonding the semi-permeable filters 38 to the composite 52 during the cure.

The portion of the vacuum assembly above film 44 acts as a heater sub-assembly to provide sufficient heat to composite patch 36 for curing. The heater assembly may comprise, for example, a caul 30, heat distribution film 58, breather plies 48, additional film 44, and heater blanket 26, as illustrated in the embodiment of FIG. 10. Any suitable heater assembly that will provide sufficient heat for curing may be employed in place of the heater assembly illustrated in FIG. 10. A thermocouple 60 may be employed for sensing temperature, if desired.

Heater blanket 26 may be a conventional silicone blanket, or alternatively, a fiberglass high temperature heater blanket. In one embodiment, where the cure temperatures are between about 400° F. to about 425° F., the use of a fiberglass heater blanket in the configuration of FIG. 10 may allow a standard vacuum bag 22 to be used, as well as standard sealant tape 42 to be used to seal the vacuum bag along its periphery, as opposed to high temperature vacuum bags and sealant tapes, which are more expensive and difficult to work with. The fiberglass blanket provides additional insulation, which results in temperatures lower than the cure temperature being maintained above the blanket, thereby allowing use of the standard materials. For example, for a 415° F. dwell during the cure, the temperatures may remain below 250° F. above the fiberglass blanket.

The particular conditions for the cure process, such as temperatures, pressures and dwell times are chosen depending on the materials used for composite patch 36 and the inconsistent composite 52. Temperatures may range, for example, from about 150° F. to about 450° F., and exemplary pressures may range from about 1 inch Hg to about atmospheric pressure (i.e., about 29.92 inches Hg). The dwell time at the cure temperature may be any suitable period, which will provide the desired degree of polymerization and glass transition temperature $T_g$ for the cured material.

Figure 11:
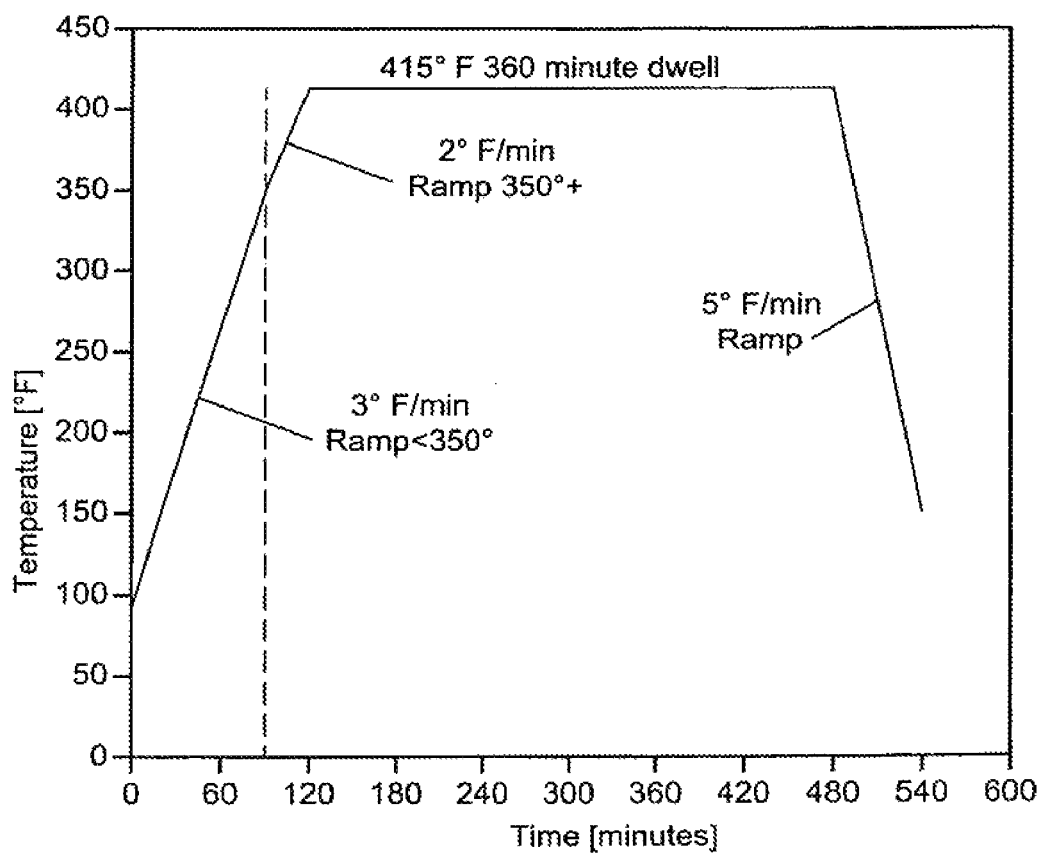
FIG. 11 illustrates a curing process schedule, according to one embodiment of the present application.

FIG. 11 illustrates an exemplary cure process temperature profile for an embodiment where composite patch 36 comprises a dicyanate ester monomer resin, such as AroCy® L10 resin. As illustrated, the temperature is ramped up to a first temperature of about 350° F. at a rate of about 3° F./minute. The rate of temperature ramp is then decreased to about 2° F./minute. The temperature may be ramped at the decreased rate to a cure temperature ranging, for example, from about 400° F. to 425° F. In the illustrated embodiment, the cure temperature is about 415° F. for a dwell time of about 360 minutes. The temperature is then cooled to about 150° F. at a rate of about 5° F. or less.

The temperature and dwell times for the cure process may be chosen to advance the polymerization of the resin to provide a composite patch having a desired glass transition temperature, $T_g$, while not thermally damaging composite 52. In one embodiment, the desired ambient $T_g$ may be, for example, above about 450° F., and more preferably above about 500° F.

In one embodiment, the cure process may be performed under vacuum conditions. The vacuum pressure in the cure process may range from about 1 inch Hg to pressures at or near atmospheric pressure. In one embodiment, the cure pressure ranges from about 15 inches Hg to about 27 inches Hg, and is more preferably about 25 inches Hg.

In another embodiment, the composite patch may be cured for about 2 hours under vacuum at the desired cure temperature, and then subsequently post cured for about 4 hours, using the same pressures, temperature ramp rates and temperatures discussed above with respect to FIG. 11. In one embodiment the post cure is performed at a temperature ranging from about 400° F. to about 425° F., and at pressures ranging from about 15 inches Hg to about 27 inches Hg. In an alternative embodiment, the post cure process is performed at about atmospheric pressure.

In another embodiment, the wet composite patch may be cured off the composite part under temperature and pressure conditions, dwell times and ramp rates similar to those described above with respect to FIG. 11. For example, the wet composite patch may be cured in an autoclave. In one embodiment, an off-the-composite cure may employ a string bleeder assembly, as described with respect to FIG. 10 above. After curing, the composite patch may be bonded or mechanically fastened to the inconsistent composite. For example, the composite part may be bolted or riveted to the inconsistent composite, as discussed above. Alternatively, an already cured composite patch may be bonded to the inconsistent part using an adhesive.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method of preparing an impregnated composite patch for use in reworking a composite part, the method comprising:
    providing a wet composite patch which is impregnated with resin;
    heating the impregnated composite patch to a temperature that causes the resin containing gaseous components to flow from the impregnated composite patch along a flow path;
    flowing the resin along the flow path to a filter; and
    venting the gaseous components from the resin through the filter while preventing the resin from flowing through the filter in order to remove the gaseous components from the impregnated composite patch while reducing the flow of resin out of the impregnated composite patch,
    wherein the flow path comprises a first portion having a first flow capability and a second portion having a second flow capability that is less than the first flow capability, the flow rate of resin through the flow path being limited by the second flow capability.

2. The method of claim 1, wherein the resin flows along the flow path through the first portion and through the second portion with more of the resin flowing through the first portion than through the second portion.

3. The method of claim 2, wherein the first portion comprises a porous fabric adjacent to the impregnated composite patch.

4. The method of claim 3, wherein the second portion comprises at least one string bleeder positioned around the periphery of the porous fabric.

5. The method of claim 1, further comprising preventing the resin from flowing through an un-perforated portion of an impermeable separate physical barrier which is disposed at least one of adjacent to the filter or along the flow path.

6. The method of claim 5, wherein the impermeable separate physical barrier comprises at least one of a sealant tape or a film.

7. The method of claim 1 wherein the method is used to rework a composite part of an aircraft during a pre-production phase of construction of an aircraft.

8. The method of claim 1 wherein the method is used to rework a composite part of a subassembly of an aircraft.

9. The method of claim 1 wherein the method is used to rework a composite part during maintenance and rework of an aircraft.

10. The method of claim 1 wherein the composite patch is attached to a surface of a composite part.

11. The method of claim 1 wherein the composite patch is at least one of bonded onto a surface of a composite part, bonded substantially flush with a surface of a composite part, or bolted to a surface of a composite part.

12. The method of claim 5, further comprising flowing the filter vented gaseous components through a perforated portion of the impermeable separate physical barrier into a breather material.

13. The method of claim 12, further comprising flowing the filter vented gaseous components from the breather material into a vacuum line.

14. The method of claim 2, further comprising preventing the resin from flowing through an un-perforated portion of an impermeable separate physical barrier which is disposed at least one of adjacent to the filter or along the flow path.

15. The method of claim 14, further comprising flowing the filter vented gaseous components through a perforated portion of the impermeable separate physical barrier into a breather material.

16. The method of claim 15, further comprising flowing the filter vented gaseous components from the breather material into a vacuum line.

17. The method of claim 16, wherein the first portion comprises a porous fabric adjacent to the impregnated composite patch, the second portion comprises at least one string bleeder positioned around the periphery of the porous fabric, and the impermeable separate physical barrier comprises both a film disposed along the flow path and a sealant tape disposed adjacent to the filter.

* * * * *